(12) United States Patent
Liang

(10) Patent No.: US 9,391,729 B2
(45) Date of Patent: Jul. 12, 2016

(54) METHOD AND APPARATUS FOR MONITORING PERFORMANCE, AND REMOTE RADIO UNIT

(75) Inventor: Hongming Liang, Chengdu (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 103 days.

(21) Appl. No.: 14/361,644

(22) PCT Filed: Nov. 29, 2011

(86) PCT No.: PCT/CN2011/083148
§ 371 (c)(1),
(2), (4) Date: May 29, 2014

(87) PCT Pub. No.: WO2013/078616
PCT Pub. Date: Jun. 6, 2013

(65) Prior Publication Data
US 2014/0355492 A1    Dec. 4, 2014

(51) Int. Cl.
| H04J 3/14 | (2006.01) |
| H04L 5/00 | (2006.01) |
| H04L 5/14 | (2006.01) |
| H04B 17/18 | (2015.01) |
| H04B 17/19 | (2015.01) |
| H04B 17/354 | (2015.01) |

(52) U.S. Cl.
CPC . *H04J 3/14* (2013.01); *H04B 17/18* (2015.01); *H04B 17/19* (2015.01); *H04L 5/0005* (2013.01); *H04L 5/14* (2013.01); *H04B 17/354* (2015.01)

(58) Field of Classification Search
None
See application file for complete search history.

(56) References Cited

U.S. PATENT DOCUMENTS

| 8,711,903 B2 * | 4/2014 | Rheinfelder | H04B 1/18 375/219 |
| 2001/0043613 A1 * | 11/2001 | Wibowo | H04J 3/1682 370/468 |
| 2002/0021687 A1 * | 2/2002 | Toki | H03F 1/32 370/345 |
| 2003/0202614 A1 | 10/2003 | Braithwaite et al. | |
| 2004/0070386 A1 * | 4/2004 | Muto | H04B 17/309 324/76.29 |

(Continued)

FOREIGN PATENT DOCUMENTS

| CN | 1491497 A | 4/2004 |
| CN | 101741479 A | 6/2010 |

(Continued)

OTHER PUBLICATIONS

PCT International Preliminary Report on Patentability (Chapter I) for PCT Counterpart Application No. PCT/CN2011/083148, (Jun. 12, 2014), 6 pages.

(Continued)

*Primary Examiner* — Jeffrey M Rutkowski
*Assistant Examiner* — Mehedi S Aley
(74) *Attorney, Agent, or Firm* — NDWE LLP

(57) ABSTRACT

The present application discloses a method for monitoring performance in a telecommunication system. The method comprises receiving transmitter observation receiver data from a transmission link; down-converting the transmitter observation receiver data to time-divisionally acquire a signal band, a high adjacent band and a low adjacent band of the transmitter observation receiver data; and calculating adjacent channel leakage ratio from power of the signal band, the high adjacent band and the low adjacent band of the transmitter observation receiver data. The present application also discloses an apparatus for monitoring performance and a remote radio unit including the same.

19 Claims, 2 Drawing Sheets

(56) References Cited

U.S. PATENT DOCUMENTS

2008/0265996 A1 10/2008 Kim et al.
2010/0158155 A1 6/2010 Borkar et al.
2013/0262545 A1* 10/2013 Shibayama ........ H03H 17/0248
 708/300

FOREIGN PATENT DOCUMENTS

| CN | 102201874 A | 9/2011 |
| WO | WO-02/17586 | 2/2002 |

OTHER PUBLICATIONS

Chinese Office Action, Application No. 201180075124.0, dated Mar. 24, 2015, 9 pages.
Extended European Search Report, EP Application No. 11876833.2, dated May 8, 2015, 8 pages.
PCT International Search Report for PCT Counterpart Application No. PCT/CN2011/083148, (Sep. 13, 2012), 3 pages.
First Office Action, CN Application No. 201180075124.0, dated Oct. 30, 2015, 19 pages.

* cited by examiner

METHOD AND APPARATUS FOR MONITORING PERFORMANCE, AND REMOTE RADIO UNIT

CROSS-REFERENCE TO RELATED APPLICATIONS

This application is a National stage of International Application No. PCT/CN2011/083148, filed Nov. 29, 2011, which is hereby incorporated by reference.

TECHNICAL FIELD

The present disclosure relates to communication systems, and more particularly, to an apparatus and a method for monitoring performance in a telecommunication system, and a remote radio unit including the apparatus for monitoring performance.

BACKGROUND

In 3G or beyond 3G mobile system infrastructure, a typical network topology of base stations includes a baseband unit (BBU) and a plurality of remote radio units (RRUs). The RRUs are placed near the antenna as the final end close to the air interface, and coupled to the BBU to convert a baseband signal to an RF signal, or vice versa. Typically, the RRUs have some analog circuitries for radio power transmission and some digital circuitries for evaluating performance of the RRUs and supporting the analog circuitries.

Digital circuitries of an RRU may perform transceiver interfacing, pulse shaping, up/down frequency converting, peaks clipping, and most importantly, digital pre-distortion (DPD) to compensate power amplifier (PA)'s non-linearity and memory effects, etc. The performance evaluation includes measurements of transmit power, transmit power efficiency, Extended Master Session Key (EMSK), adjacent channel leakage ratio (ACLR), error vector magnitude (EVM), etc.

The adjacent channel leakage is always a concern for the RRU, which is caused by non-linearity of the PA where odd-order intermodulation distortion (IMD) components are introduced into the desired signal band. To compensate the non-linearity of the PA, a DPD module is operable to pre-distort an input signal of the PA in accordance with the measured ACLR, so that the odd-order of IMD components are at least partially canceled. Thus, the ACLR is an important transmit spectrum shape measurement figure.

Before delivery of the RRU, it is subjected to a test so as to meet radio requirements. The test includes measurement of the ACLR for pre-verifying the DPD module. However, the bothering issue is that the ACLR would deteriorate due to many reasons and potential risks in an application environment.

One approach widely known in the art to implement monitoring performance in the application environment is to use internal coefficients updating status of the DPD module to indicate the RRU performance. The approach is based on two assumptions: one is that DPD output validity is the only factor that influences the DPD performance; the other is that the DPD output validity and the DPD performance are determined by the internal coefficients updating status. In other words, an asserted internal coefficients updating status ensures a valid DPD output and a good DPD performance. However, the fact is that the two assumptions are not always tenable.

It is still desirable to implement monitoring performance of the RRU in the application environment in cost-efficient and reliable manner, and report to a user or take recovering actions when the above problem occurs.

SUMMARY

It is an object of the present invention to overcome the above defect in the prior art.

According to one aspect of the present invention, there is provided a method for monitoring performance in a telecommunication system. The method comprises receiving transmitter observation receiver data from a transmission link; down-converting the transmitter observation receiver data to time-divisionally acquire a signal band, a high adjacent band and a low adjacent band of the transmitter observation receiver data; and calculating adjacent channel leakage ratio from power of the signal band, the high adjacent band and the low adjacent band of the transmitter observation receiver data.

Optionally, the signal band, the high adjacent band and the low adjacent band of the transmitter observation receiver data may be acquired at three different center frequencies.

Optionally, the high adjacent band may be acquired at a center frequency shifted+carrier bandwidth with respect to the center frequency at which the signal band may be acquired.

Optionally, the low adjacent band may be acquired at a center frequency shifted−carrier bandwidth with respect to the center frequency at which the signal band may be acquired.

Optionally, the transmitter observation receiver data may be down-converted in a digital down converter in a reception link, and the digital down converter may be operable to down convert reception data.

Optionally, the transmitter observation receiver data and the reception data may be time-divisionally directed into and out of the digital down converter by a switching signal.

Optionally, a part of the transmitter observation receiver data that overlaps the reception data may be discarded.

Optionally, the signal band, the high adjacent band and the low adjacent band of the transmitter observation receiver data may be time-divisionally acquired at one transmission time slot or at different transmission time slots.

Optionally, the telecommunication system is Time Division Duplexing system.

According to another aspect of the present invention, there is provided an apparatus for monitoring performance in a telecommunication system. The apparatus comprises a mixer operable to mix transmitter observation receiver data from a transmission link with a center frequency signal; a filter coupled to the mixer and operable to filter the transmitter observation receiver data; a calculation module coupled to the filter, and a synchronization controller coupled to the mixer and the calculation module and operable to synchronize the mixer and the calculation module. The mixer mixes the transmitter observation receiver data with a center frequency signal have three different center frequencies to time-divisionally acquire a signal band, a high adjacent band and a low adjacent band of the transmitter observation receiver data. The calculation module is operable to calculate adjacent channel leakage ratio from power of a signal band, a high adjacent band and a low adjacent band of the transmitter observation receiver data.

Optionally, the calculation module may comprise a processor operable to calculate the power of the signal band, the high adjacent band and the low adjacent band of the transmitter observation receiver data at a first time slot, a second time slot and a third time slot respectively, and to calculate the adjacent channel leakage ratio at a fourth time slot; a counter operable to receive a clock signal from the synchronization controller and indicate the first time slot, the second time slot, the third time slot and the fourth time slot by counting the clock signal; and a memory operable to store the power of the signal band, the high adjacent band and the low adjacent band of the transmitter observation receiver data at the first time slot, the second time slot and the third time slot respectively.

Optionally, the three different center frequencies defined in the above method may also be applicable for the apparatus.

According to another aspect of the present invention, there is provided a remote radio unit in a telecommunication system. The remote radio unit comprises a power amplifier operable to amplify transmission data in a transmission link; a digital down converter operable to down convert a reception data in a reception link; and the above apparatus for monitoring performance. The apparatus for monitoring performance shares the mixer and the filter in the digital down converter.

Optionally, the remote radio unit further comprises a multiplexer and a de-multiplexer coupled with the digital down converter. The multiplexer and the de-multiplexer may be controlled by a switching signal so that the transmitter observation receiver data and the reception data may be time-divisionally directed into and out of the digital down converter.

Optionally, the transmitter observation receiver data may be directed into and out of the digital down converter at transmission time slots, and the reception data may be directed into and out of the digital down converter at reception time slots.

Optionally, the remote radio unit further comprises an error detector operable to detect a part of the transmitter observation receiver data that overlaps the transmission data.

BRIEF DESCRIPTION OF THE DRAWINGS

The above and other objects, features and advantages will be more apparent from the following description of embodiments with reference to the attached drawings, in which.

DETAILED DESCRIPTION

The embodiments of the present invention will be detailed below with reference to the attached drawings. It should be noted that the following embodiments are illustrative only, rather than limiting the scope of the present invention.

In the preset disclosure, the term "transmitter observation receiver" or "TOR" means a receiver that dedicatedly receives the transmitter's feedback so as to observe the transmitter and the term "carrier bandwidth" means an occupied spectrum band width of a carrier.

The present inventor recognized that ACLR could be derived from a feedback signal of a transmission data in a transmission link, for monitoring performance of an RRU in an application environment. For example, the feedback signal could be TOR data. Only one filter with a sharp transit band and an attenuated stop band may be used to time-divisionally acquire a signal band, a high adjacent band and a low adjacent band of the TOR data for calculating the ACLR.

Figure 1:
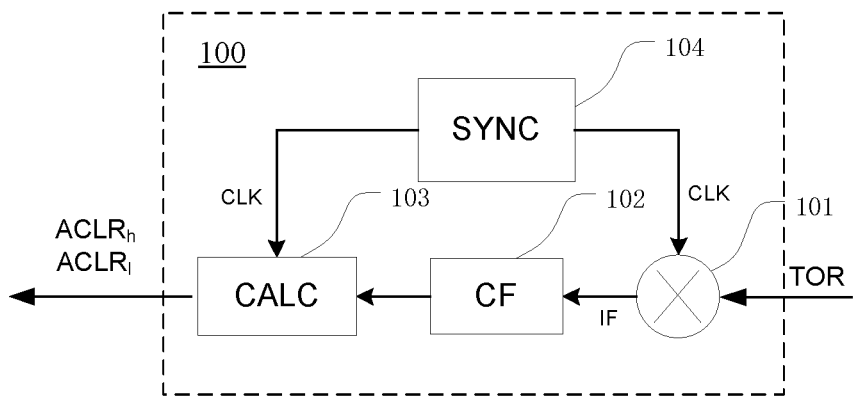
FIG. 1 is a block diagram showing an apparatus for monitoring performance according to an embodiment of the present invention.

FIG. 1 is a block diagram showing an apparatus for monitoring performance according to an embodiment of the present invention. The apparatus 100 may be incorporated into an RRU, for example, in a time division duplexing (TDD) mode systems. However, the apparatus 100 is also applicable for any known or future telecommunication system which includes a PA for radio power transmission and suffers from adjacent channel leakage.

As shown in FIG. 1, the apparatus 100 comprises a mixer 101, a filter 102, a calculation module 103, and a synchronization controller 104. TOR data is routed from a TOR link to the apparatus 100 as an input signal. The mixer 101 is operable to mix the TOR data with a center frequency signal corresponding to the desired band of the TOR data. The filter 102 is coupled to the mixer 101 and operable to acquire the desired band of the TOR data. The calculation module 103 calculates and stores power of the desired band of the TOR data, and further calculates ACLR. The mixer 101 and the calculation module 103 are synchronized by the synchronization controller 104 which provides a synchronization signal such as a clock signal to the mixer 101 and the calculation module 103.

For the purpose of measuring the ACLR, the mixer 101 mixes the TOR data with a center frequency signal having three different center frequencies at three different time slots. The calculation module 103 is notified by the synchronization signal and thus knows which one of the desired bands of the TOR data is currently acquired at each time slot. Then, the calculation module 103 calculates the ACLR at a fourth time slot.

In an example, a signal band, a high adjacent band and a low adjacent band of the TOR data have an identical bandwidth. The filter 102 has a sharp transition band approximately equal to the bandwidth of the signal band (i.e. the bandwidth of the high adjacent band or the low adjacent band) of the TOR data.

In an example, in the mixer 101, the high adjacent band may be acquired at a center frequency shifted + carrier bandwidth with respect to the center frequency at which the signal band may be acquired, and the low adjacent band may be acquired at a center frequency shifted − carrier bandwidth with respect to the center frequency at which the signal band may be acquired.

In an example, the synchronization controller 104 generates the above four time slots from transmission time slots so as to simplify its inner clock circuitry. For example, the synchronization controller 104 generates the above four time slots by dividing one transmission time slot into four sub-time slots, or generates the above four time slots corresponding to four successive transmission time slots.

In an example, the transmission link is an downlink in a base station. In an example, the TOR data is converted into digital data by down sampling, before being sent to the mixer or sent to the calculation module 103.

Figure 2:
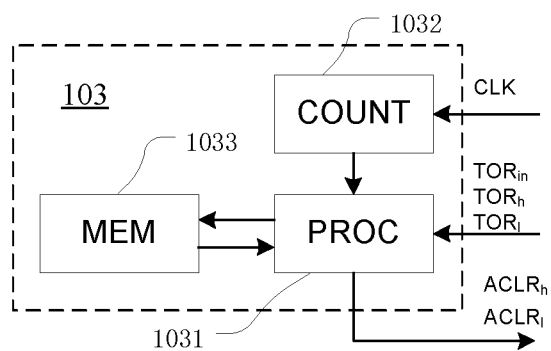
FIG. 2 is a block diagram showing a calculation module in an apparatus for monitoring performance according to an embodiment of the present invention.

FIG. 2 is a block diagram showing a calculation module in an apparatus for monitoring performance according to an embodiment of the present invention. The calculation module 103 comprises a processor 1031 to which the signal band, the high adjacent band and the low adjacent band of the TOR data are input from the filter 102, a counter 1032 to which the clock signal is input from the synchronization controller 104, and a memory 1033 which stores calculation results from the processor 1031.

The counter 1032 counts the clock signal from the synchronization controller 104, and indicates three different time slots for calculating power of the TOR data. The processor 1031 calculates the powers of the signal band, the high adjacent band and the low adjacent band of the TOR data at the three different time slots respectively. The memory 1033 stores the powers of the three bands of the TOR data.

After the calculation module 103 has calculated the powers of the signal band, the high adjacent band and the low adjacent band of the TOR data, the calculation module 103 further calculates the ACLR at a fourth time slot, by the following formula:

$$ACLR_h = 10 \, Log_{10}(Pwr_{H\_band}/Pwr_{I\_band}) \quad (1)$$

$$ACLR_l = 10 \, Log_{10}(Pwr_{L\_band}/Pwr_{I\_band}) \quad (2)$$

where $Pwr_{I\_band}$, $Pwr_{H\_band}$, and $Pwr_{L\_band}$ are powers of the signal band, the high adjacent band and the low adjacent band of the TOR data, respectively, and $ACLR_h$ and $ACLR_l$ are ACLRs of the high band and the low band of the TOR data, respectively.

The processor 1031 may be an FPGA or a CPU. The CPU is preferable because it is more cost-efficient when performing division and logarithm.

In another example, the time slots for calculating and storing powers of three bands of the TOR data may not be the three different time slots for acquiring the three bands of the TOR data. Instead, the calculation module 103 may calculate and store the power of each band of the TOR data at any time after acquisition of one band of the TOR data but before acquisition of the next band of the TOR data.

In another example, the fourth time slot may not be a successive one after the three different time slots for acquiring the three bands of the TOR data. Instead, the calculation module 103 may calculate the ACLR at any time after the current acquisition of the three bands of the TOR data but before the next acquisition of the three bands of the TOR data.

Figure 3:
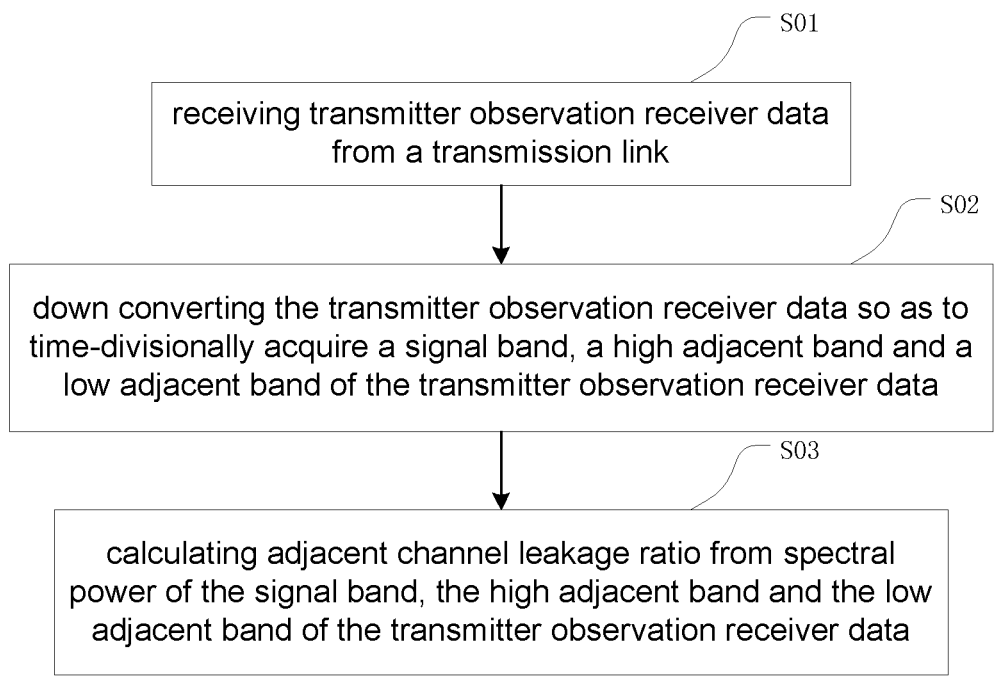
FIG. 3 is a flowchart illustrating a method for monitoring performance according to an embodiment of the present invention.

FIG. 3 is a flowchart illustrating a method for monitoring performance according to an embodiment of the present invention. The flow begins at step S01, at which step the apparatus 100 for monitoring performance receives TOR data, which is a feedback signal from a PA on a transmission link.

At step S02, the mixer 101 and the filter 102 in the apparatus 100 for monitoring performance are operable to down convert the TOR data at a first time slot, a second time slot and a third time slot, respectively, so as to time-divisionally acquire the signal band, the high adjacent band and the low adjacent band of the TOR data.

At step S03, the calculation module 103 in the apparatus 100 for monitoring performance is operable to calculate and store powers of the signal band, the high adjacent band and the low adjacent band of the TOR data at the three different time slots respectively, and calculate the ACLR at a fourth time slot, from the stored powers of the three bands of the TOR data. The calculation module 103 and the mixer 101 are synchronized by the synchronization controller 104 such that the calculation module 103 knows which one of the desired bands of the TOR data is currently acquired at each time slot.

In an RRU of a TDD system, such as TDD-LTE, transmission data (i.e. downlink data (DL) in a base station) are sent and reception data (i.e. uplink data (DL) in the base station) are received at an air interface, at different transmission time slots. To this end, the TDD radio signal is separated into two independent links, i.e. a transmission link and a reception link, at a radio part of the RRU. The two independent links are activated according to a TDD switching signal $Tdd_{sw}$ derived from a FPGA logic.

In the transmission time slots, the reception link is void (supposed to be noise). Similarly, in the reception time slots, the transmission link is void (supposed to be noise).

The present inventor further recognized that a signal band, a high adjacent band and a low adjacent band of the TOR data could be acquired by a digital down converter (DDC) in the reception link at the transmission time slots.

Figure 4:
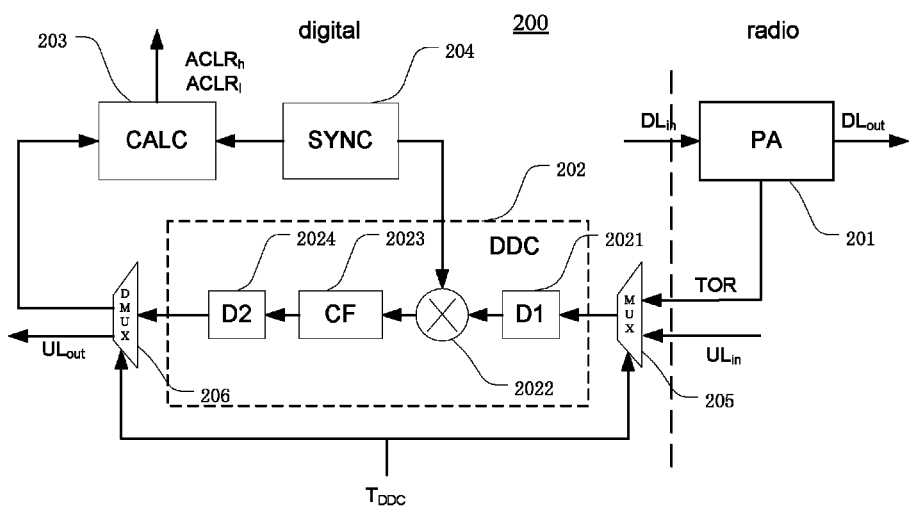
FIG. 4 is a block diagram showing a remote radio unit according to an embodiment of the present invention.

FIG. 4 is a block diagram showing a remote radio unit according to an embodiment of the present invention. In FIG. 4, the PA 201 is typically a part of a conventional transmission link, and the DDC 202 is typically a part of the conventional reception link. TOR data, which is a feedback signal of a transmission data in a transmission link, is fed back via a TOR link from the PA 201 directly to and dedicatedly used by a DPD module (not shown) at transmission time slots. The reception data is sent via a reception link to and down converted in the DDC 202 at reception time slots. Conventionally, the TOR link (corresponding to the transmission link) and the reception link are independently activated at the transmission time slots and the reception time slots, respectively.

However, the RRU 200 according to the present invention utilizes idle time of the DDC 202 at the transmission time slots, with only little resource requirement and few modifications in the prior TOR/reception link.

As shown in FIG. 4, the TOR data is routed from the PA 201 to the DDC 202 at the transmission time slots. The apparatus 100 for monitoring performance, as shown in FIGS. 1 and 2, is incorporated into the RRU 200 such that it shares a mixer and a filter in the DDC 202. In other words, the DDC 202 is used for down converting the reception data at the reception time slots and down converting the TOR data at the transmission time slots.

To this end, the RRU 200 comprises a multiplexer 205 and a de-multiplexer 206 coupled with an input and an output of the DDC 202 respectively, and both controlled by a switching signal $T_{DDC}$, so that the TOR data and the reception data are time-divisionally directed into and out of the DDC 202.

At the reception time slots, the reception data is directed into and out of the DDC 202 so that the reception link is activated conventionally.

At the transmission time slots, the TOR data is not only sent to the DPD module (not shown), but also directed into and out of the DDC 202. Referring to FIG. 4, the TOR data is applied to the DDC 202 through the multiplexer 205. The DDC 202 comprises a first sampling rate converter 2021 which down-samples the TOR data, a mixer 2022 which mixes the digital TOR data with a center frequency signal and shift the center frequency of the TOR data to zero, a filter 2023 which filters out the shifted signal of the TOR data, and a second sampling rate converter 2024 which further down-samples an IF signal of the TOR data and converts it into a baseband signal. The TOR data is output from the DDC 202 through the demultiplexer 206 as a sample signal having an in-phase component I and a quadrature component Q.

The sample signal of the TOR data is further applied to a calculation module 203 which calculates power of the sample signal of the TOR data. The mixer 2022 in the DDC 202 and the calculation module 103 are synchronized by a synchronization controller 204 which provides a synchronization signal such as a clock signal.

The filter 2023 in the DDC 202 is supposed to have a sharp transition band and an attenuated stop band (normally above 50 dBc). By shifting the centre frequency of the TOR data with +/− carrier bandwidth, a high adjacent band and a low adjacent band of the TOR data can be acquired accordingly. Consequently, the signal band, the high adjacent band and the low adjacent band of the TOR data can be acquired at three different time slots by the mixer 2022 at three different center frequencies. The calculation module 203 is notified by the synchronization signal and thus knows which one of the desired bands of the TOR data is currently acquired at each time slot, and then calculates the ACLR at a fourth time slot.

In an example, the synchronization controller 204 generates the above four time slots from transmission time slots so as to simplify its inner clock circuitry. For example, the synchronization controller 204 generates the above four time slots by dividing one transmission time slot into four sub-time slots, or generates the above four time slots corresponding to four successive transmission time slots.

Every aspect of the apparatus 100 for monitoring performance shown in FIGS. 1 and 2 is applicable for the RRU 200 according to the preset invention.

Figure 5:
FIG. 5 is a block diagram showing a switching signal generator in the remote radio unit according to an embodiment of the present invention.

FIG. 5 is a block diagram showing a switching signal generator in the remote radio unit according to an embodiment of the present invention. The switching signal generator 300 generates the above switching signal $T_{DDC}$ of the DDC 202 from the TDD switching signal $Tdd_{sw}$ of the RRU 200.

Figure 6:
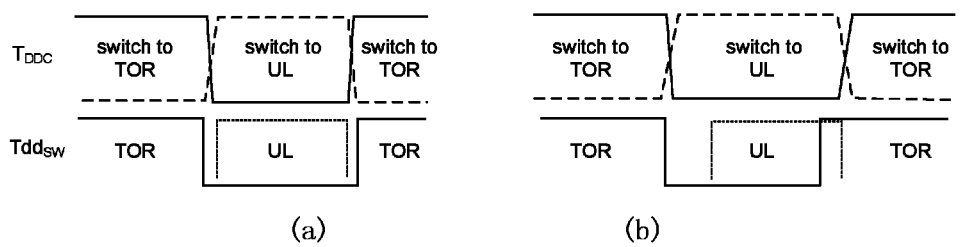
FIGS. 6(a) and (b) are time charts showing the relationship between switching signals of the remote radio unit and switching signals of a down-converter in the remote radio unit.

FIGS. 6(a) and (b) are time charts showing the relationship between the switching signals $T_{DDC}$ of the remote radio unit and the TDD switching signal $Tdd_{sw}$ of the TDD system. The switching signals $T_{DDC}$ of the DDC 202 include a TOR switching signal and a reception switching signal, which are applied to the multiplexer 205 and the demultiplexer 206 simultaneously, for switching the DDC 202 between the TOR link and the transmission link.

The TOR switching signal and the reception switching signal are normally complementary ones, and typically correspond to the transmission time slots and the reception time slots, as shown in FIG. 6(a). In other words, the TOR switching signal and the reception switching signal are a copy version and an inverse version of the TDD switching signal $Tdd_{sw}$ of the TDD system, respectively.

However, the TOR link and the reception link may have different digital delay and/or analog delay because an electrical path of the TOR link to the input of DDC is different from that of the reception link. There is a potential risk that the TOR data overlaps with the reception data at the input of DDC. Consequently, the measured ACLR may be erroneous. The overlapped part of the TOR data should not be directed into the DDC so as to ensure normal data traffic.

To solve this issue, the difference between an exact arriving time of the TOR data and that of the reception data should be measured or evaluated by circuit simulation, before delivery of the RRU. The TOR switching signal and the reception switching signal correspond to the transmission time slots and the reception time slots, but now have a dead zone when the TOR data overlaps with the reception data, as shown in FIG. 6(b). As mentioned above, the dead zone may be determined by measuring the exact arriving time of the TOR data and that of the reception data. The overlapped part of the TOR data using for calculating the ACLR is thus discarded. The remaining part of the TOR data is used for calculating the ACLR and still sufficient for giving an accurate value.

The present invention can be easily incorporated into the prior RRU because various aspects of the present invention have no impact on the prior RRU. The present invention adds only a sub-path of transmission data flow and introduces few changes to the reception link. In a preferable embodiment, the present invention utilizes idle time of the DDC in the reception link, which is cost-efficient because some inner logics are reused and is reliable because the ACLR is calculated in digital domain. The measured ACLR provides a straightforward approach for monitoring performance in a telecommunication system.

It should be appreciated that the apparatus 100 and the RRU 200 may further comprise other units/components necessary for the operation of the apparatus, the description of which is omitted here so as not to obscure the concept of the present invention. Also, each of the units/components in the apparatus 100 and the RRU 200 can be implemented in hardware, firmware or software, i.e., by a dedicated circuit component or by an appropriately programmed processor.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

A glossary of the abbreviations used in this patent specification is set out below to facilitate an understanding of the present invention.

BBU baseband unit
RRU remote radio unit
PA power amplifier
DPD digital pre-distortion
ACLR adjacent channel leakage radio
EMSK emission mask
EVM error vector magnitude
IMD inter-modulation distortion
TOR transmitter observation receiver
$TOR_{in}$ signal band of the transmitter observation receiver data
$TOR_h$ high adjacent band of the transmitter observation receiver data
$TOR_l$ low adjacent band of the transmitter observation receiver data
DL downlink data
UL uplink data
DDC digital down converter
TDD time division duplexing
CF channel filter
CALC calculation module
SYNC synchronization controller
PROC processor
COUNT counter
MEM memory
D1, D2 first sampling rate converter, second sampling rate converter
MUX multiplexer
DMUX demultiplexer
SG switching signal generator

I claim:

1. A method for monitoring performance in a telecommunication system, comprising:
receiving transmitter observation receiver data as a feedback signal from a transmission link;
down-converting the transmitter observation receiver data utilizing a mixer to time-divisionally acquire a signal band, a high adjacent band, and a low adjacent band of the transmitter observation receiver data in respective three time slots by changing a center frequency of the mixer to obtain outputs of the signal band, the high adjacent band, and the low adjacent band, respectively;

calculating power of the signal band, the high adjacent band, and the low adjacent band in the respective three time slots, wherein a synchronization signal is utilized to generate the three time slots for the mixer to change the center frequency and to synchronize the calculating of the power of the signal band, the high adjacent band, and the low adjacent band, based on the respective outputs of the signal band, the high adjacent band, and the low adjacent band; and calculating a first adjacent channel leakage ratio from the power of the signal band and the high adjacent band, and calculating a second adjacent channel leakage ratio from the power of the signal band and the low adjacent band.

2. The method according to claim 1, wherein the signal band, the high adjacent band, and the low adjacent band of the transmitter observation receiver data are acquired at a first center frequency, a second center frequency, and a third center frequency for the mixer, respectively.

3. The method according to claim 2, wherein the second center frequency is shifted + carrier bandwidth with respect to the first center frequency.

4. The method according to claim 2, wherein the third center frequency is shifted − carrier bandwidth with respect to the first center frequency.

5. The method according to claim 1, wherein the transmitter observation receiver data is down-converted in a digital down converter in a reception link, and the digital down converter is operative to down-convert reception data.

6. The method according to claim 5, wherein the transmitter observation receiver data and the reception data are time-divisionally directed into and out of the digital down converter by a switching signal.

7. The method according to claim 6, further comprising:
discarding a part of the transmitter observation receiver data that overlaps the reception data.

8. The method according to claim 1, wherein the three time slots for the signal band, the high adjacent band, and the low adjacent band of the transmitter observation receiver data are time-divisionally acquired at one transmission time slot.

9. The method according to claim 1, wherein the three time slots for the signal band, the high adjacent band, and the low adjacent band of the transmitter observation receiver data are time-divisionally acquired at different transmission time slots.

10. The method according to claim 1, wherein the telecommunication system is Time Division Duplexing system.

11. An apparatus for monitoring performance in a telecommunication system, comprising:
a mixer operative to mix and down-convert transmitter observation receiver data obtained as a feedback signal from a transmission link, wherein the transmitter observation receiver data is down-converted in respective three time slots utilizing a first center frequency, a second center frequency, and a third center frequency by the mixer to time-divisionally acquire outputs of a signal band, a high adjacent band and a low adjacent band of the transmitter observation receiver data;
a filter coupled to the mixer and operative to filter the outputs of the signal band, the high adjacent band and the low adjacent band;
a calculation module coupled to the filter and operative to receive filtered outputs of the signal band, the high adjacent band and the low adjacent band, respectively in the three time slots, to calculate power of the signal band, the high adjacent band, and the low adjacent band in the respective three time slots, to calculate a first adjacent channel leakage ratio from the power of the signal band and the high adjacent band, and to calculate a second adjacent channel leakage ratio from the power of the signal band and the low adjacent band; and
a synchronization controller coupled to the mixer and the calculation module and operative to generate a synchronization signal to synchronize the mixer and the calculation module to set the three time slots for the mixer to change to the first, second and third center frequencies and for the calculation module to calculate the power of the signal band, the high adjacent band, and the low adjacent band, based on the respective outputs of the signal band, the high adjacent band, and the low adjacent band, in order to calculate the first and second adjacent channel leakage ratios.

12. The apparatus according to claim 11 wherein the second center frequency is shifted + carrier bandwidth with respect to the first center frequency.

13. The apparatus according to claim 11, wherein the third center frequency is shifted − carrier bandwidth with respect to the first center frequency.

14. The apparatus according to claim 11, wherein the calculation module comprises:
a processor operative to calculate the power of the signal band, the high adjacent band, and the low adjacent band of the transmitter observation receiver data at a first time slot, a second time slot and a third time slot, respectively, of the three time slots and to calculate the first and second adjacent channel leakage ratios at a fourth time slot;
a counter operative to receive a clock signal as the synchronization signal from the synchronization controller to set the first time slot, the second time slot, the third time slot, and the fourth time slot; and
a memory operative to store the calculated power of the signal band, the high adjacent band, and the low adjacent band of the transmitter observation receiver data at the first time slot, the second time slot, and the third time slot, respectively.

15. A remote radio unit in a telecommunication system, comprising:
a digital down converter operative to down convert received data, wherein the received data comprises transmitter observation receiver (TOR) data obtained as a feedback signal from a transmission link and reception data in a reception link that are time-divisionally directed into the digital down converter, the digital down converter comprising:
a sampling rate converter that receives and down samples the received data to output down-sampled data;
a mixer operative to receive the down-sampled data and, when the received data is the TOR data, the mixer is operative to mix the down-sampled TOR data in respective three time slots utilizing a first center frequency, a second center frequency, and a third center frequency by the mixer to time-divisionally acquire outputs of a signal band, a high adjacent band and a low adjacent band of the down-sampled TOR data; and
a filter coupled to the mixer and operative to filter the outputs of the signal band, the high adjacent band and the low adjacent band;

a calculation module coupled to the digital down converter and operative to receive filtered outputs of the signal band, the high adjacent band and the low adjacent band, respectively in the three time slots, to calculate power of the signal band, the high adjacent band, and the low adjacent band in the respective three time slots, to calculate a first adjacent channel leakage ratio from the power of the signal band the high adjacent band, and to calculate a second adjacent channel leakage ratio from the power of the signal band and the low adjacent band; and a synchronization controller coupled to the mixer of the digital down converter and the calculation module and operative to generate a synchronization signal to synchronize the mixer and the calculation module to set the three time slots for the mixer to change to the first, second and third center frequencies and for the calculation module to calculate the power of the signal band, the high adjacent band, and the low adjacent band, based on the respective outputs of the signal band, the high adjacent band, and the low adjacent band, in order to calculate the first and second adjacent channel leakage ratios.

16. The remote radio unit according to claim 15, further comprising a multiplexer and a de-multiplexer coupled with the digital down converter and controlled by a switching signal so that the transmitter observation receiver data and the reception data are time-divisionally directed into and out of the digital down converter.

17. The remote radio unit according to claim 16, wherein the transmitter observation receiver data is directed into and out of the digital down converter at transmission time slots, and the reception data is directed into and out of the digital down converter at reception time slots.

18. The remote radio unit according to claim 15, further comprising an error detector operative to detect a part of the transmitter observation receiver data that overlaps the reception data.

19. The remote radio unit according to claim 15, wherein the telecommunication system is Time Division Duplexing system.

* * * * *